INVENTORS
CLIFFORD E. HERRICK, JR.
ALFRED H. SPORER
CLAYTON V. WILBUR
BY Edward W. Brown
ATTORNEY

United States Patent Office 3,545,969
Patented Dec. 8, 1970

3,545,969

METHOD OF INDUCING AN ELECTROSTATIC CHARGE PATTERN ON AN INSULATING SURFACE

Clifford E. Herrick, Jr., Los Gatos, and Alfred H. Sporer and Clayton V. Wilbur, San Jose, Calif., assignors to International Business Machines Corporation, Armonk, N.Y., a corporation of New York

Continuation of application Ser. No. 474,583, July 26, 1965. This application July 14, 1969, Ser. No. 847,493
Int. Cl. G03g *13/22*
U.S. Cl. 96—1 5 Claims

ABSTRACT OF THE DISCLOSURE

A reproduction process in which an uncharged persistent photoconductive member is exposed to a pattern of light and dark, and then brought into contact or near contact with an insulating surface while a uniform external voltage is applied across and at least during the separation of the insulating surface from the photoconductive member. An electrostatic charge pattern is formed on the insulating surface in which the areas of electrostatic charges correspond to the light exposed areas of the photoconductive member. If desired prior to bringing the photoconductive member into contact with the insulating surface, the photoconductive member can be electrostatically charged of such a polarity so as to prevent charge formation on the areas of the insulating surface corresponding to the dark exposed areas of the photoconductive member.

This application is a continuation of application Ser. No. 474,583, filed July 26, 1965, now abandoned.

The invention relates to photographic reproduction and, more particularly, to a method employing materials which exhibit persistent photoconductivity.

A method of electrophotography employing persistent photoconductors is known and consists of exposing such a photoconductor to a light pattern which renders the light struck areas latently conductive. The photoconductor then is brought into contact with an insulating sheet and a negative corona charge is applied to the back of the sheet. After separation, a positive electrostatic charge pattern corresponding to the conductive areas of the photoconductor is present on the insulating sheet. This electrostatic pattern either is developed with a positive toner to form a visible image in the non-charged areas or with a negative toner to form a visible image of the electrostatic pattern. The same conductive areas of the photoconductor can be used to form an electrostatic pattern on a number of insulating sheets sequentially brought into contact with the photoconductor and, hence, a number of copies can be produced from one exposure.

This known method, however, is undesirable for a number of reasons. First, it only produces fair quality copies, as shown in Example I, because during separation of the insulating sheet from the photoconductor, the voltage across the gap of the non-conductive areas of photoconductor and the insulating sheet increases approximately linearly. This increase in voltage causes spurious discharges in these areas which form electrostatic charges unrelated to the image on the insulating sheet. When the sheet is developed, these charges cause other than the image areas to become visible and, thus, substantially reduce the quality of the copy. Moreover, this known method employs a corona discharge which requires an electrical potential of the order of 7,000 volts and, hence, necessitates a large and expensive power supply. Further, this known process is slow because the steps of charging and removing the insulating sheet are performed sequentially.

Accordingly, it is the primary object of this invention to provide an improved method in which substantially all of the copies from one exposure are of high quality.

Another object of this invention is to provide an improved method which does not require a large and expensive power supply for the formation of the electrostatic image.

Another object of this invention is to provide an improved method which permits two of the steps to be carried out simultaneously and thereby enables copies to be produced at a rapid rate.

Still another object of this invention is to provide an improved method which preferably includes an additional step for improving the quality of the first copy of a number of copies from one exposure.

A further object of this invention is to provide an improved method which is well suited for a relatively small and inexpensive desk-top office copy device.

In general, the foregoing and other objects and other advantages of the invention are achieved by the following method.

First, an uncharged persistent photoconductive member is exposed to a pattern of light to form a latent conductive image in the exposed areas. Next, the exposed surface is brought into contact or near contact with an insulating surface and then separated or peeled away from the insulating surface while a uniform external voltage is applied across and at least during the separation of the two surfaces. An electrostatic charge pattern corresponding to the conductive pattern of the photoconductor is formed on the insulating surface.

The charge pattern can be developed with toner in any of the conventional ways and fixed thereon or transferred to paper. Alternatively, the charge pattern can be developed by heating to form a thermoplastic recording or a frost deformation recording In addition to improve the quality of the first copy, it is preferred to apply an electrostatic charge to the photoconductive surface of such a polarity so as to prevent charge formation on the areas of the insulating surface corresponding to the non-conductive portions of the photoconductor. More preferably, this electrostatic charge is applied to the photoconductive surface after it has been exposed to the pattern of light.

Other and further objects and advantages of the invention will be apparent in the following more particular description of the preferred embodiments of the invention, as illustrated in the acocmpanying drawing in which:

FIG. 1*a* is a schematic drawing showing optical exposure of the photoconductor.

FIG. 1*b* is a schematic showing reflex exposure of the photoconductor.

FIGS. *5a* through *5d* are schematic drawings showing various types of development.

FIG. *6a* is a schematic drawing in which the toner particles are fixed on the insulating surface.

FIG. *6b* is a schematic drawing showing transfer of the toner image to a copy sheet.

Figure 1A:
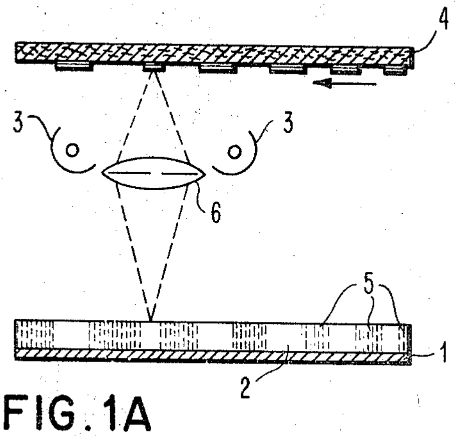
Figure 1B:
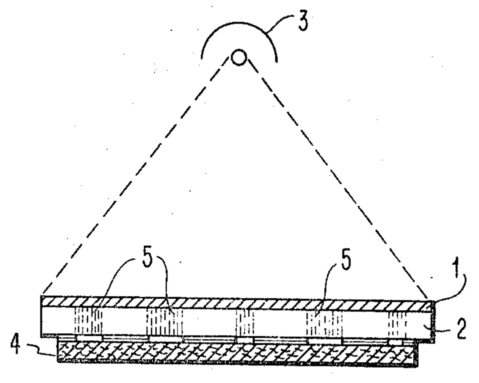

In FIGS. 1*a* and 1*b*, a support 1 carrying a photoconductive layer 2 is exposed by a light source 3 to an image bearing member 4 to be copied. This exposure forms latent persistent conductivity areas 5 in the layer 2. An optical system including a lens 6 may be employed for exposing the layer 2, as shown in FIG. 1*a*. Alternatively, as shown in FIG. 1*b*, a reflex exposure mode may be used. In the reflex mode, the photoconductive layer 2 is placed in contact with the image bearing member 4 and exposed by the light source 3. The light is reflected in the non-image areas to form conductive area 5 in the layer 2. While any persistent photoconductor may be used with the optical exposure mode of FIG. 1*a*, it is preferred that both the support 1 and the layer 2 be substantially transparent to the wave lengths of radiation of the light source 3 for the reflex exposure mode of FIG. 1*b*.

Suitable materials for support 1 are materials having a surface resistivity of about 1 to 10 megohms/square. Examples of such materials are conductive paper and metals, such as copper, aluminum, zinc, tin, iron, and lead. Examples of transparent conductors for the reflex mode of FIG. 1*b* include polyethylene terephthalate coated with a thin layer of aluminum or copper, and NESA glass.

Photoconductive layer 2 may be either inorganic or organic and the conductive pattern need only be persistent for a time which is sufficient to permit contact with and separation from an insulating surface. Normally, persistence of a few seconds will be sufficient for a single copy. However, it is preferred that the layer exhibit a longer persistence so as to provide time for multiple copies from one exposure. Suitable photoconductive materials whose persistence range from a few seconds to many hours include both inorganic and organic photoconductors.

Examples of inorganic photoconductors which may be used are oxides, sulphides, selenides, and tellurides of zinc, bismuth, molybdenum, lead, antimony, and cadmium which are either dispersed in an insulating binder and coated on support 1 or coated on the support without a binder, such as by vapor deposition. Mixtures of these photoconductors, such as for example, zinc cadmium sulfide, may also be used. In addition, these inorganic photoconductors may contain small quantities, i.e., .01 to .1%, of activators, such as copper, silver, manganese, and chlorine.

Examples of organic photoconductors include what can be termed "small molecule" photoconductors dispersed or dissolved in a binder and polymeric photoconductors which can be self supporting. Most of these organic photoconductors essentially are transparent and, hence, are particularly well suited for the reflex mode. The small molecule photoconductors include the following:

OXADIAZOLES AND IMIDIAZOLES 2,5-bis-[4′-diethylaminophenyl-(1′)]-1,3,4-oxadiazole;
2,5-bis-[4′-(n-propylamino)-2′-chlorophenyl-(1′)]-1,3,4-oxadiazole or
2,5-bis-[4′-N-ethyl-N-n-propylaminophenyl-(1′)]-1,3,4-oxadiazole;
2,5-bis-[4′-dimethylaminophenyl]-1,3,4-oxadiazole;
2-(4′-dimethylaminophenyl)-6-methoxy-benzimidazole

OXAZOLES, THIAZOLES AND TRIAZOLES 2-(4′-chlorophenyl)-phenanthreno-(9′,10′:4,5)-oxazole;
2-(4′-diethylaminophenyl)-benzthiazole;
1-methyl-2,5-bis-[4′-diethylaminophenyl-(1′)]-1,3,4-triazole

THIOPHENES AND TRIAZINES 2,3,5-triphenylthiophene;
3-(4′-aminophenyl)-5,6-dipyridyl-(2′)-1,2,4-triazine or
3-(4′-dimethylaminophenyl)-5,6-di-4″-phenoxyphenyl)-1,2,4-triazine

HYDRAZONES 4-dimethyl-aminobenzaldehyde-isonicotinic acid hydrazone

STYRYL COMPOUNDS 2-(4′-dimethylaminostyryl)-6-methyl-4-pyridone or
2-(4′-dimethylaminostyryl)-5(or 6)-amino-benzimidazole or
bis 4-dimethylaminostyryl ketone

AZOMETHINES 4-dimethylamino-benzylidene-β-napthylamine

ACYLHYDRAZONES 4-dimethylaminobenzylidenebenzhydrazide;
4-dimethylaminobenzylidene-4-hydroxybenzoic hydrazide;
4-dimethylaminobenzylidene-2-aminobenzoic hydrazide;
4-dimethylaminobenzylidene-4-methoxybenzoic hydrazide;
4-dimethylaminobenzylideneiso-nicotinic hydrazide;
4-dimethylaminobenzylidene-2-methylbenzoic hydrazide;

PYRAZOLINES 1,3,5-triphenylpyrazoline;
1,3-diphenyl-5-[p-methoxyphenyl]-pyrazoline;
1,3-diphenyl-5-[p-dimethylaminophenyl]pyrazoline;
1,5-diphenyl-3-styrylpyrazoline;
1-phenyl-3-[p-dimethylaminostyryl]-5-[p-dimethylaminophenyl]-pyrazoline

IMIDAZOLONES

4-[p-dimethylaminophenyl]-5-phenylimidazolone;
4-furfuryl-5-phenylimidazolone

IMIDAZOLETHIONES

4-[p-dimethylaminophenyl]-5-phenylimidazolethione;
1,3,4,5-tetraphenylimidazolethione;
1,3,5-triphenyl-4-[p-dimethylaminophenyl]imidazolethione;
1,3,4-triphenyl-5-furfurylimidazolethione

BENZIMIDAZOLES

2-[4′-dimethylaminophenyl]-benzimidazole;
1-methyl-2-[4′-dimethylaminophenyl]-benzimidazole;
1-phenyl-2-[4′-dimethylaminophenyl]-benzimidazole

BENZOXAZOLES

2-[4′-dimethylaminophenyl]-benzoxazole

BENZOTHIAZOLES

2-[4′-dimethylaminophenyl]-benzothiazole

Suitable binders for use in preparing the inorganic and small molecule photoconductive layers comprise polymers having fairly high dielectric strength and which are good electrically insulating film-forming vehicles. Materials of this type include both organic solvent and water solvent resins and comprise styrene-butadiene copolymers; silicone resins; styrene-alkyd resins; soya-alkyd resins; poly(vinyl chloride); poly(vinylidene chloride); vinylidene chloride, acrylonitrile copolymers; poly(vinyl acetate); vinyl acetate-vinyl chloride copolymers; poly(vinyl acetals), such as poly(vinyl formal); polyacrylic and methacrylic esters, such as poly(methyl methacrylate), poly(n-butyl methacrylate), poly(isobutyl)methacrylate, etc.; polystyrene nitrated polystyrene; polymethylstyrene; isobutylene polymers; polyesters, such as poly(ethylene-alkaryloxyalkylene terephthalate); phenol-formaldehyde resins; ketone resins; polyamide; polycarbonates; polyvinyl acetate-crotonic acid, etc. Methods of making resins of this type have been described in the prior art, for example, styrene-alkyd resins can be prepared according to the method described in U.S. Pats. 2,361,019 and 2,258,423. Other types of binders which can be used in the photoconductive layers of the invention include such materials as paraffin, mineral waxes, etc.

Suitable polymeric photoconductors are, for example, poly-N-acrylylphenothiazine,
poly-N-(β-acrylyloxy-ethyl)-phenothiazine,
poly-N-(2-acrylyloxy propyl)-phenothiazine,
polyallylcarbazole,
poly-N-2-acrylyloxy-2-methyl-N-ethyl carbazole,
poly-N(2-p-vinylbenzoylethyl)-carbazole,
poly-N-propenylcarbazole,
poly-N-vinylcarbazole,
poly-N-2-methacrylyloxypropyl carbazole,
poly-N-acrylyl-carbazole,
poly-4-vinyl-p-(N-carbazyl)-toluene,
poly (vinylanisal acetophenone), and
polyindenes.

Other suitable polymeric photoconductors are those disclosed in copending applications, Ser. No. 332,835, filed Dec. 23, 1963, now abandoned; Ser. No. 404,902, filed Oct. 19, 1964 now U.S. Pat. No. 3,294,763; and Ser. No. 304,696, filed Aug. 26, 1963 now U.S. Pat. No. 3,268,550.

If desired, the monomers of the polymeric photoconductors can be copolymerized with each other or with other monomers, such as vinyl acetate, methylacrylate, vinylcinnamate, polystyrene, 2-vinylpyridine.

The sensitivity of both the inorganic and organic photoconductors can be extended from the ultraviolet into the visible range of the electromagnetic spectrum by the addition of cationic dyestuff sensitizer. In addition, the photoconductive properties of the organic photoconductors can be improved by the addition of an activator. Preferably, the organic photoconductors are cosensitized with both a dyestuff sensitizer and an activator, as described in copending application Ser. No. 474,997, filed July 26, 1965. In general, the quantity of the dyestuff sensitizer added to the photoconductor ranges from about 0.01 to about 5%, with the preferred range being from about 0.5 to about 3%. The quantity of activator added to the organic photoconductor varies according to the compound used and ranges from about 0.1 to about 10%. The preferred amount for most of the compounds is about 4%. Mixtures of several activators and several dyestuffs may be used in place of a single activator and a single dyestuff.

Examples of the dyestuff sensitizers are triarylmethane dyestuffs such as Malachite Green, Brilliant Green, Victoria Blue B, Methyl Violet, Crystal Violet, Acid Violet 6B; xanthene dyestuffs, namely rhodamines, such as Rhodamine B, Rhodamine 6G, Rhodamine G Extra, and Fast Acid Eosin G, as also phthaleins such as Eosin S, Eosin A, Erythrosin, Phloxin, Rose Bengal, and Fluorescein; thiazine dyestuffs such as Methylene Blue; acridine dyestuffs such as Acridine Yellow, Acridine Orange and Trypaflavine; cyanine dyestuffs, e.g. Pinacyanol, Cryptocyanine and Cyanine.

Examples of activators for the organic photoconductor are, for example, organic carboxylic acids, e.g., benzoic acid, phthalic acid and tetrachlorophthalic acid, dibromomaleic acid, 2-bromo-benzoic acid, 2-nitro-benzoic acid, 3 - nitrobenzoic acid, 4 - nitro - benzoic acid, 3 - nitro-4-ethoxy - benzoic acid, 2 - chloro - 4 - nitro - 1 - benzoic acid, 3 - nitro - 4 - methoxy - benzoic acid, 4 - nitro - 1-methyl - benzoic acid, 2-chloro - 5 - nitro - 1 - benzoic acid, 3-chloro - 6 - nitro - 1 - benzoic acid, 4-chloro - 3-nitro - 1 - benzoic acid, 5-chloro - 3 - nitro - 2 - hydroxy-benzoic acid, 4-chloro - 2 - hydroxy - benzoic acid, 2,4-dinitro - 1 - benzoic acid, 2-bromo - 5 - nitro - benzoic acid, 2-cyano - cinnamic acid, 2,4-dichloro-benzoic acid, 3,5-dinitro-benzoic acid, 3,5-dinitro-salicylic acid, malic acid; nitrophenols, e.g., 4-nitrophenol, and picric acid; carboxylic acid anhydrides, e.g., maleic anhydride, phthalic anhydride, tetrachloro-phthalic anhydride, and dibromo-maleic acid anhydride; and nitroanilines, e.g., 2,2′, 4,4′, 6,6′-hexanitrodiphenylamine, picramide, 2,4-dinitroaniline, 3-chloro-6-nitroaniline, picramic acid, p-nitroaniline, 2,6-dichloro-4-nitroaniline, 2-methyl-4-nitroaniline, 4-chloro - 2 - nitroaniline, 4-amino - 4 - nitrobenzoic acid, p-(2,4-dinitroaniline)phenol, 2,4-dinitrophenylamine, 2-nitrodiphenylamine.

Solvents for preparing coating compositions of the binder-type inorganic photoconductors and organic photoconductors include a number of solvents such as benzene, toluene, acetone, 2-butanone, chlorinated hydrocarbons, e.g., methylene chloride, ethylene chloride, etc., ethers, e.g., tetrahydrofuran, or mixtures of these solvents. An alkaline aqueous solution is used for water soluble polymers, such as polyvinyl acetate-crotonic acid.

The photoconductive layer 2 can be coated on the support 1 in any well known manner, such as doctor-blade coating, spin-coating, dip-coating, and the like.

Figure 2:
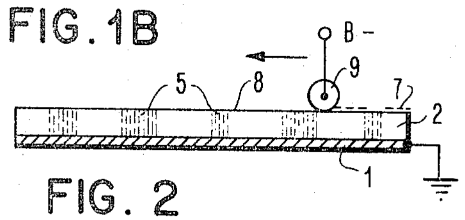
FIG. 2 is a schematic drawing showing the application of electrostatic charge on the surface of the exposed photoconductor.

The first copy of a number of copies from one exposure is not as high a quality as the rest of the copies because charge formation occurs on the insulating surface in areas corresponding to the non-conductive areas of the photoconductor. To improve the quality of this first copy, it is preferred, according to the present invention, to apply an electrostatic charge to the surface of the photoconductor of such a polarity to prevent charge formation on the areas of the insulating surface corresponding to the non-conductive areas of the photoconductor. More preferably, this electrostatic charge is applied to the photoconductive surface after it has been exposed to the pattern of light. For example, as shown in FIG. 2, a negative electrostatic charge 7 is applied to the surface 8 of the photoconductive layer 2 by a conductive roller 9. This negative electrostatic charge only remains in the non-conductive areas of the photoconductor due to the conductivity of the other areas and will prevent positive charge formation on the portions of the insulating surface which are brought in contact with the photoconductive surface. When the conductive roller 9, as shown in FIG. 2, is employed, the voltage applied is about 400 to about 1500 volts, with the preferred voltage being about 1000 volts. Other means of electrostatically charging the photoconductive surface, such as corona discharge and the like, may be used.

This preferred charging step is only necessary for the first copy. That is, if a number of copies are made from one exposure, the photoconductor 2 is charged prior to contact with the first insulating sheet but it is not necessary to charge the photoconductor prior to the second, et seq.

Figure 3:
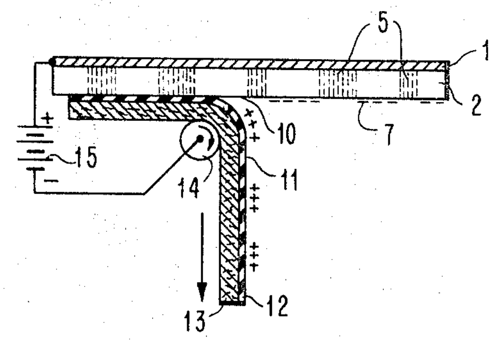
FIG. 3 is a schematic drawing showing charge formation on the insulating surface.

Next, the exposed, and preferably electrostatically charged, photoconductor is placed in contact or near contact with the insulating surface. As shown in FIG. 3, the surface 10 of the photoconductive layer 2 is brought into contact with the surface 11 of an insulating layer 12 carried on a support 13. An electric field is applied across the interface of the photoconductive surface 10 and the insulating surface 11 by a conductive roller 14. The voltage applied to the roller 9 by a voltage source 15 may be from about 400 to about 900 volts, with the preferred voltage being 700 volts. As the insulating layer 12 is separated from the photoconductive layer 2, the air present between the two surfaces 10, 11 is selectively ionized in the conductive regions of the photoconductor and causes the formation of an electrostatic charge pattern on the insulating surface 11.

It will be noted that the application of the electric field and the separation of the insulating layer 12 essentially are simultaneous steps (in contrast to sequentially) and thereby substantially improve the copying speed.

Suitable materials for the insulating layer 12 are those having a resistivity of at least $10^{12}$ ohms/cm., with the preferred materials being those with a resistivity greater than $10^{14}$ ohms/cm. For example, the materials recited above as suitable as binders for the inorganic and small molecule photoconductors may be used for the insulating material. This material may be self-supporting or may be the layer 12 carried on the support 13, such as shown in FIG. 3. The support 13 may be, for example, paper, textiles, and metals, viz, aluminum and copper. Also, the insulating material may contain a photoconductor, such as listed above, and fillers, such as titanium dioxide.

One of the primary advantages of the present invention is that a number of copies, for example more than one hundred, can be made from one exposure of the photoconductor, all of which are substantially the same high quality. To make a number of copies of the light pattern to which the photoconductor was exposed, a number of different insulating members are sequentially brought in contact with and separated from the exposed photoconductor with the voltage applied until the desired number of copies have been made. These insulating members may be individual members or may be part of a continuous roll. Alternatively, the insulating member may be in the form of a drum or a continuous belt which repeatedly is brought into contact with and separated from the exposed photoconductor with the voltage applied. A new electrostatic pattern is formed each time and is either developed with toner and the toner image transferred to a copy sheet or the electrostatic charge pattern is transferred to the copy sheet and developed thereon.

Figure 4:
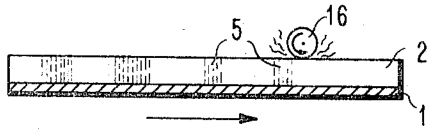
FIG. 4 is a schematic drawing in which the latent conductive image of the photoconductor is erased with heat.
Figure 5A:
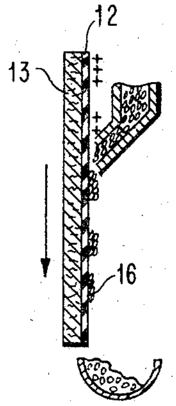
Figure 5B:
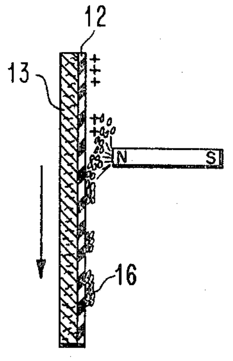
Figure 5C:
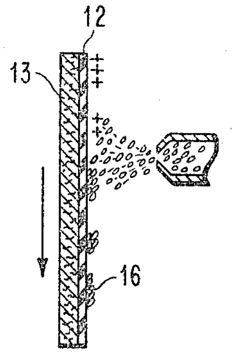
Figure 5D:
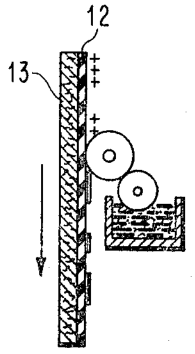
Figures 6A, 6B:
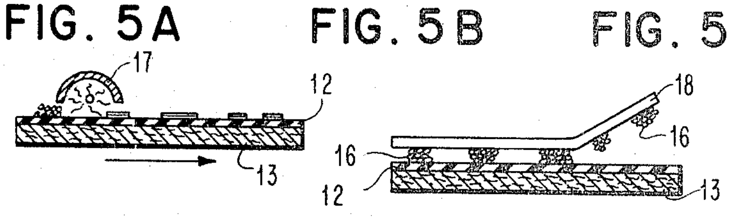

If, however, copies of different images are desired, the persistent conductive pattern of one image must be erased so as to prepare the photoconductor for the exposure of a different image. This is accomplished by heating the photoconductor for not longer than five seconds. The preferred erasure temperature is about 125° C. for about one to five seconds, but temperatures between about 100° and about 150° C. may be used. There are a number of suitable heating means for erasing the persistent conductive pattern in the photoconductor. For example, as shown in FIG. 4, the photoconductive layer 2 is moved by a heated roller 16 to remove the persistent conductive image 5. Other heating means include an AC electric field to cause induction heating.

FIGS. *5a–d* illustrate some of the various methods of developing the latent electrostatic image on the insulating layer. FIG. *5a* shows cascade development, which is described in U.S. Pat. 2,618,552. FIG. *5b* illustrates magnetic brush development, which is described in U.S. Pat. 2,874,063. Powder cloud development is shown in FIG. *5c* and the method and a suitable apparatus are described in U.S. Pat. 2,690,394. In FIG. *5d*, roller application of a liquid developer is illustrated. The developer composition can be one described in U.S. Pat. 2,907,674. Other types of liquid development include immersion of the electrostatic image in the developer. Also, the developer composition may or may not be self-fixing.

If the developer composition is not self-fixing, toner particles 16 may be fixed by fusing them into the insulating layer by a heating element 17, as shown in FIG. *6a*, or may be solvent fixed. Alternatively, the toner particles may be transferred to a copy sheet 18, such as paper, as shown in FIG. *6b*. One type of toner transfer is described in U.S. Pat. 2,576,047.

Either negative or positive toner particles may be used as is well known in the art. For example, as shown in FIGS. *5a–d*, a negative toner is employed for developing the positive charged areas of the insulating layer 12. This will yield a negative copy of the positive image bearing member 4.

Instead of developing the eletcrostatic image with toner, the insulating member carrying the image may be heated to form a thermoplastic recording of the image as described in U.S. Pat. No. 3,063,872. A frost deformation recording can also be made by employing the procedures described by F. A. Nicoll, R.C.A. Review, page 209, June 1964.

The general nature of the invention having been set forth, the following exampls are now presented as illustrations, but not limitations, of the methods and means of carrying out the invention. The use of the term "negative toner" in the following examples means toner which is attracted to a positive electrostatic charge or which is negatively charged. "Positive toner" means toner which is positively charged or attracted to a negative electrostatic charge.

Example I

The following is a comparison between the process disclosed in British Patent 977,200 and the process of the present invention. A photoconductor was prepared in the following manner: 40 mg. of 3,5-dinitrobenzoic acid was dissolved in 14.3 gms. of a 7% polyvinyl carbazole solution of 1,2-dichloroethane. To this was added 10 mg. of Malachite Green oxalate dye which was dissolved in 1 ml. of 50% each of methyl ethyl ketone and methyl alcohol. This solution was coated on a stainless steel substrate using a doctor blade set at 7 mil wet gap.

For the comparison, the photoconductor was exposed four separate times to a 40 watt incandescent lamp at a distance of 14 inches for 4 seconds through a positive master.

(I) After the first exposure, the photoconductor was brought into contact with an insulating sheet of polyvinyl butyral. The back of the insulating sheet was sprayed with a negative charge from a Xerox Processor D corona discharge unit having a negative 6000 volt potential and the insulating sheet was separated from the photoconductor. Two more insulating sheets, in sequence, were brought in contact with the exposed photoconductor and the above technique was followed. The three electrostatic charge patterns were developed with positively charged toner to yield three positive copies of the positive master. The persistent image in the photoconductor from the first exposure was erased by heating the photoconductor on a hot plate at 125° C. for about 5 seconds.

(II) After the second exposure, the photoconductor was brought into contact with three insulating sheets of polyvinyl butyral, in sequence, and the above prior art process was employed except that the corona discharge unit had a positive 6000 volt potential. The electrostatic charge patterns on the three insulating sheets were developed with negatively charged toner. Again, the persistent image was erased by the above heating technique.

(III) After the third exposure, the process of the present invention was employed. Three sheets of insulating material of polyvinyl butyral sequentially were brought into contact with the exposed photoconductor. Each insulating sheet while in contact with the photoconductor was passed between a pair of conductive rollers having an 800 volt D.C. potential. The polarity of the roller in contact with the photoconductor was positive. The three eletcrostatic charge patterns which formed were developed with positively charged toner. The persistent image was erased using the above heating technique.

(IV) Using three more insulating sheets of polyvinyl butyral, the process of the present invention again was employed as recited above, except that the polarity of the roller in contact with the photoconductor was negative. The three electrostatic charge patterns which formed were developed with negatively charged toner.

The difference in the quality of copy between the prior art process of British Patent 977,200 and the process of the present invention is listed in the following table:

| Process: | Quality of third copy |
|---|---|
| (I) | Fair–high background. |
| (II) | Fair–high background. |
| (III) | Good–low background. |
| (IV) | Good–low background. |

Example II

A photoconductor for use in the novel process was made in the following manner: 40 mg. of 3,5-dinitrobenzoic acid was dissolved in 14.3 grams of a 7% polyvinyl carbazole solution of 1,2-dichloroethane. To this was added 10 mg. of Malachite green oxalate dye which was dissolved in 1.0 ml. of 50% each of methylethyl ketone and methyl alcohol. To insure proper mixing, the prepared solution was agitated for about one hour. Then, the solution was coated on an aluminum slide using a doctor blade set at 7 mil wet gap. The resulting dried photoconductive coating was approximately 9 microns thick. The prepared photoconductor was exposed to a 40 watt tungsten bulb at a distance of 14 inches through a positive masher for one second. An insulating material of polyvinyl acetate which was part of a continuous roll was brought into contact with the exposed photoconductor and the two of them passed between a pair of conductive rollers having a 700 volt D.C. potential. The polarity of the roller in contact with the photoconductor was negative. Immediately after passing through the rollers and with the voltage still applied, the insulating material was separated from the photoconductor and a negative electrostatic pattern was formed on the insulating material corresponding to the exposed areas of the photoconductor. The exposed photoconductor was repeatedly brought into contact with other portions of the continuous roll of insulating material and passed through the rollers with the voltage applied (as stated above) until 48 negative electrostatic charge patterns were prepared. These charge patterns then were developed with negative toner using a biased magnetic brush to yield 48 positive copies of the positive image. The quality of the first copy was not quite as good as the other 47. Otherwise, all the copies were essentially as good a quality as the original positive master.

Example III

A photoconductor was prepared in the same manner as in Example II. The photoconductor was exposed to a 40 watt tungsten bulb at a distance of 14 inches through a positive image for one second. A positive electrostatic charge was applied to the surface of the photoconductor by a conductive roller having an applied voltage of 900 volts. The charge was dissipated in the exposed areas of the photoconductor. Following this, the exposed coating was brought into contact with the insulating material of a continuous roll and the procedure of Example II was followed. By this additional charging step, the quality of all the copies (including the first copy), was essentially as good as the original positive master.

As an alternative to the above example, a corona discharge unit was used in place of the conductive roller for applying the positive electrostatic charge. Again, the quality of all the copies including the first copy was essentially as good as the positive master.

Example IV

.7 gms. of polyvinyl carbazole was dissolved in 10 ml. of 1,2-dichloroethane. To this was added 7 mg. picric acid and 7 mg. Victoria Blue B dye which was dissolved in 0.5 ml. of 50% each methyl ethyl ketone and methyl alcohol. The solution was coated on an aluminum slide using a doctor blade set at a 7 mil input wet gap. The dried photoconductor was exposed for 2 seconds to 100 watt tungsten bulb at a distance of 12 inches through a negative master. An insulating sheet of polyvinyl acetate was brought into contact with the exposed coating and the two of them passed between a pair of conductive rollers having an applied potential of 600 volts, the polarity of the roller in contact with the photoconductor having a positive polarity. Immediately after passing through the rollers and with the voltage still applied, the insulating sheet and photoconductor were separated and a positive electrostatic pattern corresponding to the exposed areas of the photoconductor is formed on the insulating sheet. The electrostatic image on the insulating sheet then was developed by magnetic brush carrying a negative toner to form unfixed positive copy. A sheet of common stock paper was brought into contact with the unfixed toner image and by applying pressure, the toner image was transferred to the paper and fixed by heating.

Example V

A solution was prepared by dissolving 20 mg. of tetrachlorophthalic anhydride in 7 gms. of a 7% polyvinyl carbazole and a 1% Malachite Green oxalate solution of dichloroethane. The solution was coated on an aluminum slide using a doctor blade set at a 7 mil wet gap. The prepared photoconductor then was exposed to a 100 watt tungsten bulb for 5 seconds at a distance of 14 inches through a positive image. The exposed photoconductor was brought into contact with an insulating sheet of polyvinyl acetate and the two of them passed between conductive rollers having an applied voltage of 900 volts, the polarity of the roller in contact with the photoconductor being negative. Immediately after passing through the conductive rollers and with the voltage still applied, the photoconductor and insulating sheet were separated and a negative electrostatic charge pattern was formed on the insulating sheet corresponding to the exposed areas of the photoconductor. The electrostatic charge pattern was cascade developed with a negative toner composition to form a positive copy.

Example VI

Instead of using a polymeric photoconductor, a small molecule photoconductor was prepared as follows: 0.5 gm. of 1-phenyl-3(para-dimethylamino styryl)-5-(para-dimethylamino phenyl)pyrazoline was dissolved in a 10% solution of polystyrene in benzene. To this solution was added 10 mg. of 3,5-dinitrobenzoic acid and 5 mg. of Malachite Green, which was dissolved in 0.5 ml. of 50% each methylethyl ketone and methyl alcohol. This solution was coated on an aluminum strip using a doctor blade set at a 5 mil wet gap. The prepared photoconductor was exposed for 5 seconds to a 25 watt tungsten bulb at a distance of 14 inches through a negative image. An insulating sheet of polystyrene was brought into contact with the photoconductor and the two of them passed through conductive rollers with an applied potential of 700 volts, the polarity of the rollers in contact with the photoconductor being positive. Immediately after passing through the rollers and with the voltage still applied, the insulating sheet was separated from the photoconductor and a positive electrostatic charge pattern corresponding to the exposed area of the coating was formed on the insulating sheet. The electrostatic charge pattern was developed by a magnetic brush carrying a negative toner to form a positive copy.

Example VII

Another small molecule photoconductor was prepared by dissolving 0.5 gm. of 1 phenyl 3 (para-dimethylamino styryl)-5-(para-rimethylamino phenyl)pyrazoline in 2.5 gms. of polystyrene in benzene. To this solution was added 0.03 gm. 4,4'-6,6' tetranitro diphenic acid and 0.005 gm. Malachite Green oxalate in 5 ml. of dichloroethane. The solution was coated on an aluminum slide with an 8 mil draw. The prepared photoconductor on the slide was exposed for 5 seconds to a 40 watt tungsten bulb at a distance of 12 inches through a positive master. After bringing an insulating sheet which was part of a continuous roll of polyvinyl acetate paper in contact with the photoconductor, the photoconductor and the sheet were passed between conductive rollers with an applied potential of 900 volts, the rollers in contact with the photoconductor being negative. Immediately after passing through the rollers and with the voltage still applied, the sheet separated from the coated slide and a negative electrostatic pattern corresponding to the exposed areas of the coating was formed on the insulated sheet. Ten electrostatic patterns were formed by bringing the exposed photoconductor sequentially into contact with other portions of the continuous roll and passing them through the conductive rollers, as described above. After ten electrostatic patterns were formed, these patterns were developed by cascade development using a negative toner to form ten positive copies, only the first of which was not as good a quality as the positive master.

Example VIII

A photoconductor was prepared by dissolving 0.13 gm. of 1,3 diphenyl 5-(para-dimethylamino phenyl) pyrazoline in 2.5 gms. of 20% polystyrene in benzene. To this solution was added 0.005 gm. picric acid and 0.005 gm. Malachite Green oxalate in 5 ml. of dichloroethane. The solution was coated on an aluminum slide with a 5 mil draw. The prepared photoconductor on the slide was exposed for 10 seconds to a 100 watt tungsten bulb at a distance of 12 inches through a negative master. After bringing an insulating sheet of polyvinyl acetate in contact with the exposed photoconductor, the photoconductor and the sheet were passed between conductive rollers with an applied potential of 900 volts, the rollers in contact with the photoconductor being positive. Immediately after passing through the rollers and with the voltage still applied, the sheet separated from the photoconductor and a positive electrostatic pattern corresponding to the exposed areas of the coating was formed on the insulated sheet. The electrostatic charge pattern was developed by magnetic brush development using a negative toner to form a positive copy.

Example IX

A solution of 0.8 gm. of N,N′ diphenyl-4,5-diphenylimidazolethione, 0.5 gram polyvinyl formal in a 2 gm. of a 25% solution of methylethyl ketone was prepared. To this solution was added 0.03 gm. 4,4′-6,6′ tetranitro diphenic acid and 0.008 gm. Ethyl Violet in 0.5 ml. of 50% each methylethyl ketone and methyl ketone. The solution was coated on an aluminum slide with a 3 mil draw. This photoconductor was exposed for 1 second to a 375 watt tungsten bulb at a distance of 12 inches through a negative master. After bringing an insulating sheet in contact with the photoconductor, the photoconductor and the sheet were passed between conductive rollers with an applied potential of 600 volts, the rollers in contact with the photoconductor being positive. Immediately after passing through the rollers and with the voltage still applied, the sheet was separated from the photoconductor and a positive electrostatic pattern corresponding to exposed areas of the coating was formed on the insulated sheet. The electrostatic charge pattern was developed by magnetic brush development using a negative toner to form a positive copy.

Example X

A photoconductive coating of 70% cadmium sulphide and 30% zinc sulfide, dispersed in an epoxy binder in a 1:3 ratio on a stainless steel substrate, was heated to 100° C. for 15 seconds and cooled. The photoconductor then was exposed to a 40 watt incandescent lamp at a distance of 14 inches through a positive master. The exposed photoconductor was brought into contact with an insulating sheet of polyvinyl acetate and passed through a pair of conductive rollers having a 700 volt potential applied across them, the photoconductive coating in contact with the roller being negative. Immediately after passing through the rollers, the insulating sheet was separated from the photoconductor and a negative electrostatic charge pattern was formed on the insulating sheet. Using a negative toner and a magnetic brush biased at —100 volts, the electrostatic charge pattern was developed to form a positive copy of the positive master.

Example XI

A photoconductive formulation was prepared by adding 14.3 gms. of a 7% polyvinyl carbazole solution of 1,2-dichloroethane having dissolved therein 30 mg. of 3,5-dinitrobenzoic acid to a 1 ml. solution of 7.5 milograms of Malachite Green oxalate in a 50% methylethyl ketone and methyl alcohol. The photoconductive formulation was agitated for one hour. Then, the photoconductor was coated on a semi-transparent aluminized polyethylene terephthalate using a doctor blade at 8 mil wet gap. The resulting dried photoconductive coating was roughly 10 microns thick. This photoconductor was placed face down in intimate contact on a positive master and exposed to filtered light (4,000 to 5800 A.) from a 500 watt tungsten lamp at a distance of 14 inches. An insulating material of polyvinyl acetate, which was part of a continuous roll, was brought into contact with the reflex exposed photoconductor and the two of them passed between a pair of conductive rollers having a 900 volt D.C. potential. The polarity of the roller in contact with the photoconductor was negative. Immediately after passing through the roller and with the voltage still applied, the insulating material was separated from the photoconductor and a negative electrostatic pattern was formed on the insulating material corresponding to the exposed areas of the photoconductor. This charge pattern then was developed with a negative toner using a biased magnetic brush to yield a positive copy of the master. Ten copies from the same exposure were made by the above procedure.

Example XII

The exposed photoconductor of Example XI was heated to 100° C. on a hot plate for about 5 seconds in order to erase the persistent image. The photoconductor was then exposed in the same manner as Example XI, but prior to placing the photoconductor in contact with the insulating material, a positive electrostatic charge was applied to the surface of the photoconductor by a conductive roller having an applied voltage of 900 volts. The charge was dissipated in the exposed areas of photoconductor. Following this, the exposed coating was brought into contact with the insulating material and the procedure of Example II was followed. By this additional charging step, the quality of the first copy was improved and essentially was the same quality as the rest of the copies.

Example XIII

A photoconductor having the same formulaton as Example II, was exposed for 8 seconds to a negative master by a tungsten light source of 40 watts at a distance of 14 inches. The exposed photoconductor was attached to the upper roller of a pair of conductive rollers having a 700 volt potential across them, the upper roller being at a positive potential. A roll of insulating material of polyvinyl acetate was positioned to feed between the two rollers. By rotating the upper roller 100 times, 100 positive electrostatic patterns are formed on the insulating material. These charge patterns were developed with a magnetic brush using negative toner to form 100 positive copies of the negative master.

Example XIV

To obtain copies of two different masters, the photoconductor of the formulation of Example II, was exposed to the positive master of Example II and the procedure of that example was followed to make a copy of the master. The exposed photoconductor having a persistent conductivity image therein, then was passed through heated rollers at 120° C. at a linear velocity of 20 feet per minute. The heating erased the persistent conductivity image in the photoconductor. This photoconductor was then exposed to the negative master of Example IV and the procedure of that example followed to form a copy of that master.

Example XV

A photoconductive composition was prepared consisting of 0.5 gm. of 1,3-diphenyl-5-(p-dimethylamino)-phenylpyrazoline, 2 gms. of 10% polystyrene, 5 ml. of dichloroethane, 0.03 gm. of 2,2′,4,4′,6,6′-hexanitrodiphenylamine and 0.005 gm. of Malachite Green oxalate. This photoconductive composition was coated on an aluminum slide using a doctor blade set as a 7 ml. wet gap. The prepared photoconductor was exposed for one second to a 40 watt tungsten bulb at 14 inches through a positive master. The exposed photoconductor was brought into contact with an insulating sheet of polyvinyl acetate and the two of them passed between conductive rollers having applied voltage of 600 volts, the polarity of the roller in contact with the photoconductor being negative. Immediately after passing through the conductive rollers and with the voltage still applied, the photoconductor and insulating sheet were separated and a negative electrostatic charge pattern was formed on the insulating sheet corresponding to the exposed areas of the photoconductor. The electrostatic charge pattern was magnetic brush developed with a negative charged toner to form a positive copy of the master.

Example XVI

A photoconductive composition was prepared by using 0.5 gm. of 1,3,5-triphenyl pyrazoline, 5 gm. of 10% polystyrene, 0.03 gm. of 2,2′,4,4′,6,6′-hexanitrodiphenylamine, 0.005 gm. Malachite Green oxalate, and 5 ml. of dichloroethane. The photoconductive composition was coated on an aluminum slide with a doctor blade set at a 7 mil wet gap. Using the same procedure of Example XV except the prepared photoconductor was exposed for 4 seconds, a negative electrostatic charge pattern was formed on the insulating sheet. This charge pattern was developed with negatively charged toner using cascade developement to yield a positive copy of the master.

Example XVII

A photoconductive composition was prepared which included 14.3 gm. of 7% polyvinyl carbazole, .04 gm. of 2,2′,4,4′,6,6′-hexanitrodiphenylamine and 0.01 gm. of Malachite Green oxalate. The photoconductive composition was coated on an aluminum slide using a doctor blade set at a 7 mil wet gap. The prepared photoconductor was exposed to a 40 watt tungsten bulb for 2 seconds at a distance of 12 inches through a negative master. Exposed photoconductor was brought into contact with an insulated sheet of polyvinyl acetate. The two of them passed between conductive rollers having applied voltage of 900 volts, the polarity of the roller in contact with the photoconductor being positive. Immediately after passing through the conductive rollers and with the voltage still applied, the photoconductor and the insulating sheet were separated and a positive electrostatic charge pattern was formed on the insulating sheet corresponding to the exposed area of the photoconductor. The electrostatic charge pattern was cascade developed with negative toner to form a positive copy of the negative master.

Example XVIII

A photoconductor was prepared in the following manner: 40 mg. of 3,5-dinitrobenzoic acid was dissolved in 14.3 gms. of a 7% polyvinyl carbazole solution of 1,2-dichloroethane. To this was added 10 mg. of Malachite Green oxalate dye which was dissolved in 1 ml. of 50% each of methyl ethyl ketone and methyl alcohol. This prepared solution was coated on a stainless steel substrate using a doctor blade set at 7 mil wet gap. The prepared photoconductor was exposed to a 40 watt tungsten bulb at a distance of 14 inches to a positive master for 2 seconds. An insulating material of polyvinyl butyral having a high calendar paper base and being part of a continuous roll was brought into contact with the exposed photoconductor and the two of them passed between a pair of conductive rollers having a 700 volt D.C. potential. The polarity of the roller in contact with the photoconductor was negative. Immediately after passing through the rollers and with the voltage still applied, the insulating material was separated from the photoconductor and a negative electrostatic charge pattern was formed on the insulating material corresponding to the exposed area of the photoconductor. The exposed photoconductor was brought into contact with other portions of the continuous roll of insulating material and passed through the rollers with the voltage applied (as stated above) until 5 negative electrostatic charge patterns were prepared. These charge patterns were developed with negative toner using a bias magnetic brush to yield 5 positive copies of the positive master. The quality of the fifth copy was excellent.

While the invention has been particularly shown and described with reference to preferred embodiments thereof, it will be understood by those skilled in the art that variations in form may be made therein without departing from the spirit and scope of the invention.

What is claimed is:

1. A process of inducing electrostatic charge pattern on a member having an insulating face surface and a back surface from a photoconductive element having a face surface while the face surfaces of said element and said member are adjacent each other, comprising the sequential steps of:

first exposing said photoconductive insulating element to a pattern of light and dark to cause photoconductivity in the light exposed areas of the element, said photoconductive insulating element being capable of exhibiting persistent photoconductivity so that the photoconductivity persists during and temporarily after said exposure to the pattern of light and dark; and thereafter applying, while the photoconductivity persists in said photoconductive element and with the face surface of said element having uniform electrostatic charges thereon in the dark exposed areas of said element, a constant unidirectional field across and at least during the separation of said element and said member from each other, whereby electrostatic charges are formed on the insulating face surface of said member in areas corresponding to said light exposed areas of the photoconductive element without thereafter the existence of any charges of opposite polarity on the surface of the photoconductive element in the light exposed areas, the polarity of the unidirectional electric field at the back of said member being the same as the polarity of the electrostatic charges on the face surface of said element in the dark exposed area of the element so as to prevent electrostatic charge transfer to the insulating face surface of said member in the areas of the member corresponding to the dark exposed areas of the photoconductive element.

2. The process of claim 1 whereby the face surface of the photoconductive insulating element is uniformly, electrostatically charged prior to exposing the element to a pattern of light and dark.

3. The process of claim 1 wherein the face surface of said photoconductive insulating member is exposed to the pattern of light and dark and subsequently the face surface of said member and the exposed face surface of said element are placed adjacent each other.

4. The process of claim 3 wherein the process of inducing the electrostatic charge pattern is repeated a plurality of times with different members without re-exposing said photoconductive element.

5. The process of claim 1 wherein the patterns created by the electrostatic charges are developed to render them visible.

(References on following page)

References Cited

UNITED STATES PATENTS

| | | | |
|---|---|---|---|
| 2,833,648 | 5/1958 | Walkup | 96—1 |
| 2,937,943 | 5/1960 | Walkup | 96—1 |
| 2,976,144 | 3/1961 | Rose. | |
| 2,979,403 | 4/1961 | Giaimo. | |
| 3,113,022 | 12/1963 | Cassiers. | |
| 3,147,679 | 9/1964 | Schaffert. | |
| 3,281,857 | 10/1966 | Kaiser. | |

FOREIGN PATENTS

| | | |
|---|---|---|
| 772,873 | 4/1957 | Great Britain. |

GEORGE F. LESMES, Primary Examiner
JOHN C. COOPER, Assistant Examiner

U.S. Cl. X.R.

96—1.4, 1.5; 117—17.5